United States Patent
Braham et al.

(10) Patent No.: US 11,768,821 B1
(45) Date of Patent: Sep. 26, 2023

(54) BLOCKCHAIN BASED MULTI VENDOR CHANGE MONITORING SYSTEM

(71) Applicant: INTERNATIONAL BUSINESS MACHINES CORPORATION, Armonk, NY (US)

(72) Inventors: Adam Dale Braham, Rochester, MN (US); Jason A. Nikolai, Rochester, MN (US); Shane Smith, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/656,010

(22) Filed: Mar. 23, 2022

(51) Int. Cl.
- *G06F 16/23* (2019.01)
- *G06F 16/27* (2019.01)
- *G06F 16/2455* (2019.01)

(52) U.S. Cl.
CPC ...... *G06F 16/2358* (2019.01); *G06F 16/2365* (2019.01); *G06F 16/24556* (2019.01); *G06F 16/27* (2019.01)

(58) Field of Classification Search
CPC ............. G06F 16/2358; G06F 16/2365; G06F 16/24556; G06F 16/27
USPC ...................................................... 707/634
See application file for complete search history.

(56) References Cited

U.S. PATENT DOCUMENTS

| | | | |
|---|---|---|---|
| 10,965,527 B2 | 3/2021 | Triplet | |
| 2020/0371832 A1* | 11/2020 | Baset | .............. H04L 9/0637 |
| 2021/0119886 A1 | 4/2021 | Singla | |

FOREIGN PATENT DOCUMENTS

CN  109190410 A  1/2019

OTHER PUBLICATIONS

Akiki, et al., "CHECKSUM: Tracking Changes and Measuring Contributions in Cooperative Systems Modeling," Software and Systems Modeling, Published Jan. 5, 2021, pp. 1079-1122, vol. 20, Issue 4, Springer Link, DOI: 10.1007/s10270-020-00840-3, Retrieved from the Internet: <URL: https://doi.org/10.1007/s10270-020-00840-3>.

Author Unknown, "Case Studies: Browse various use cases powered by Hyperledger technologies," Hyperledger Foundation [online], [accessed on Jan. 19, 2022], 14 pages, Retrieved from the Internet: <URL: https://www.hyperledger.org/learn/case-studies>.

Disclosed Anonymously, "A System and Method to Integrate Blockchain into ITSM Change Management," ip.com, Oct. 4, 2017, 4 pages, IP.com No. IPCOM000251044D, Retrieved from the Internet: <URL: https://priorart.ip.com/IPCOM/000251044>.

(Continued)

*Primary Examiner* — Michael Pham
(74) *Attorney, Agent, or Firm* — Elliot J. Shine (57) ABSTRACT

A method, computer system, and a computer program product for managing a multi-vendor environment is provided. The present invention may include receiving a request to make a change to an aggregate computer system from a participant of the aggregate computer system. The present invention may include creating, in response to the request, a change block. The present invention may include receiving approval for the change block in accordance with an endorsement policy. The present invention may include adding the change block to a distributed ledger. The present invention may include monitoring a performance of the aggregate computer system.

20 Claims, 8 Drawing Sheets

(56) References Cited

OTHER PUBLICATIONS

Disclosed Anonymously, "Blockchain-Based Network Monitoring and Service Level Agreement (SLA) Verification System," IP.com, Oct. 4, 2018, 13 pages, IP.com No. IPCOM000255642D, Retrieved from the Internet: <URL: https://priorart.ip.com/IPCOM/000255642>.

Karlsson, "How Blockchain Is Transforming the Software Development Industry," Simple Programmer [online], Jan. 8, 2020 [accessed on Jan. 19, 2022], 8 pages, Retrieved from the Internet: <URL: https://simpleprogrammer.com/blockchain-software-development/>.

Mell, et al., "The NIST Definition of Cloud Computing", National Institute of Standards and Technology, Special Publication 800-145, Sep. 2011, 7 pages.

\* cited by examiner

| |
|---|
| Block Number: 5 |
| Time Stamp: 05:51:00.000001 |
| Transaction Data<br>Vendor: Vendor A<br>Change: OS Update<br>Details: ApplyXXXX Fix Pack 0302011 |
| Previous Hash: 0x00DF1B21 |
| Hash: 0x00BA1BEE |
| Status: Unconfirmed |

BLOCKCHAIN BASED MULTI VENDOR CHANGE MONITORING SYSTEM

BACKGROUND

The present invention relates generally to the field of computing, and more particularly to blockchain technology.

A service-level agreement (SLA) may be a commitment between a service provider and a client that may define the services a service provider will provide and the required level and/or standard for those services. In multi-vendor and/or multi-party complex integrated systems those SLAs may include a technical definition for mean time between failures (MTBF), mean time to repair or mean time to recovery (MTTR); identifying which party is responsible for reporting faults or paying fees; responsibility for various data rates; throughput; jitter; and/or other similar details.

Accordingly, an immutable management system to assist multi-stakeholder entities to track and approve configuration changes may be utilized to rollback changes to a system or group of systems to return to a steady state meeting SLAs and/or other agreements.

SUMMARY

Embodiments of the present invention disclose a method, computer system, and a computer program product for multi-vendor management. The present invention may include receiving a request to make a change to an aggregate computer system from a participant of the aggregate computer system. The present invention may include creating, in response to the request, a change block. The present invention may include receiving approval for the change block in accordance with an endorsement policy. The present invention may include adding the change block to a distributed ledger. The present invention may include monitoring a performance of the aggregate computer system.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for multi-vendor management. As such, the present embodiment has the capacity to improve the technical field of blockchain technology by tracking changes made to an aggregate computer system by one or more participants and triggering responses to review a set of change blocks based on monitoring of key performance indicators. More specifically, the present invention may include receiving a request to make a change to an aggregate computer system from a participant of the aggregate computer system. The present invention may include creating, in response to the request, a change block. The present invention may include receiving approval for the change block in accordance with an endorsement policy. The present invention may include adding the change block to a distributed ledger. The present invention may include monitoring a performance of the aggregate computer system.

As described previously, a service-level agreement (SLA) may be a commitment between a service provider and a client that may define the services a service provider will provide and the required level and/or standard for those services. In multi-vendor and/or multi-party complex integrated systems those SLAs may include a technical definition for mean time between failures (MTBF), mean time to repair or mean time to recovery (MTTR); identifying which party is responsible for reporting faults or paying fees; responsibility for various data rates; throughput; jitter; and/or other similar details.

Accordingly, an immutable management system to assist multi-stakeholder entities to track and approve configuration changes may be utilized to rollback changes to a system or group of systems to return to a steady state meeting SLAs and/or other agreements.

Therefore, it may be advantageous to, among other things, receive a request to make a change to an aggregate computer system from a participant of the aggregate computer system, create, in response to the request, a change block, receive approval for the change block in accordance with an endorsement policy, add the change block to a distributed ledger, and monitor a performance of the aggregate computer system.

According to at least one embodiment, the present invention may improve the performance of an aggregate computer system by utilizing a multi-vendor chain of custody and intermittently testing one or more key performance indicators.

According to at least one embodiment, the present invention may improve the performance of an aggregate computer system by utilizing a distributed ledger (e.g., shared ledger, blockchain, Hyperledger) in tracking changes to an aggregate computer system made my participants.

According to at least one embodiment, the present invention may improve the enforcement of service-level agreements and/or other agreements by using smart contract to automatically execute reviews of a set of change blocks.

According to at least one embodiment, the present invention may improve the performance of an aggregate computer system by learning which changes to the aggregate computer system may be most likely to result in sub-optimal performance of one or more key performance indicators by storing change blocks associated with the key performance indicators in a knowledge corpus (e.g., database 114) for future block reviews.

According to at least one embodiment, the present invention may improve the monitoring of changes to an aggregate computer system by adding blocks corresponding to changes to a distributed ledger (e.g., shared ledger, blockchain, Hyperledger). The change blocks requiring approval in accordance with an endorsement policy agreed upon by all participants as to which participants may act as endorsers/validators for change blocks.

Figure 1:
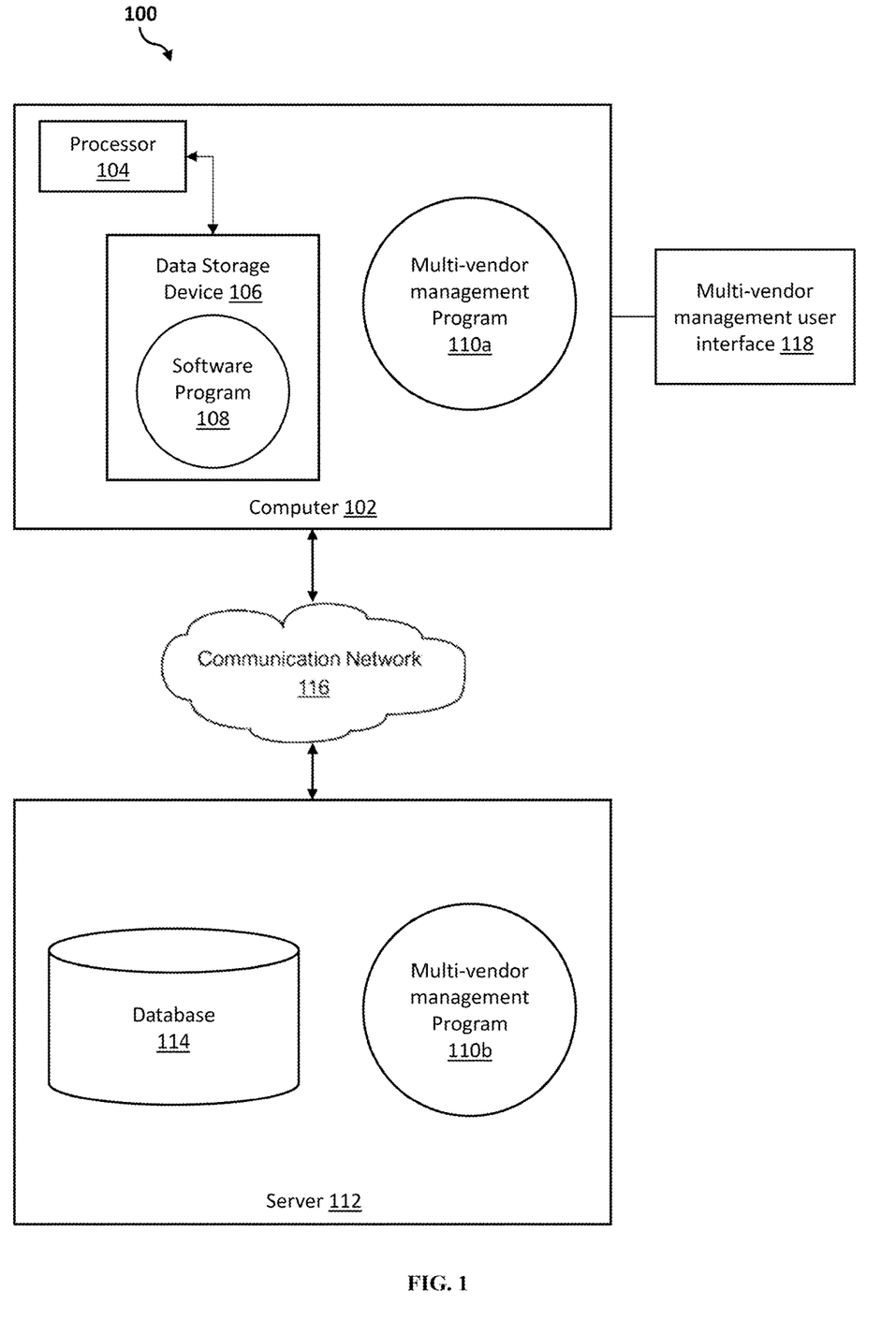
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a multi-vendor management program 110a. The networked computer environment may also include a multi-vendor management user interface 118 which may be displated by the multi-vendor management program 110a in at least an internet browser, dedicated software application, and/or as an integration with a third party software application. The networked computer environment 100 may also include a server 112 that is enabled to run a multi-vendor management program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 6, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the multi-vendor management program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the multi-vendor management program 110a, 110b (respectively) to track changes made to an aggregate computer system. The multi-vendor management method is explained in more detail below with respect to FIGS. 2 through 5B.

Figure 2:
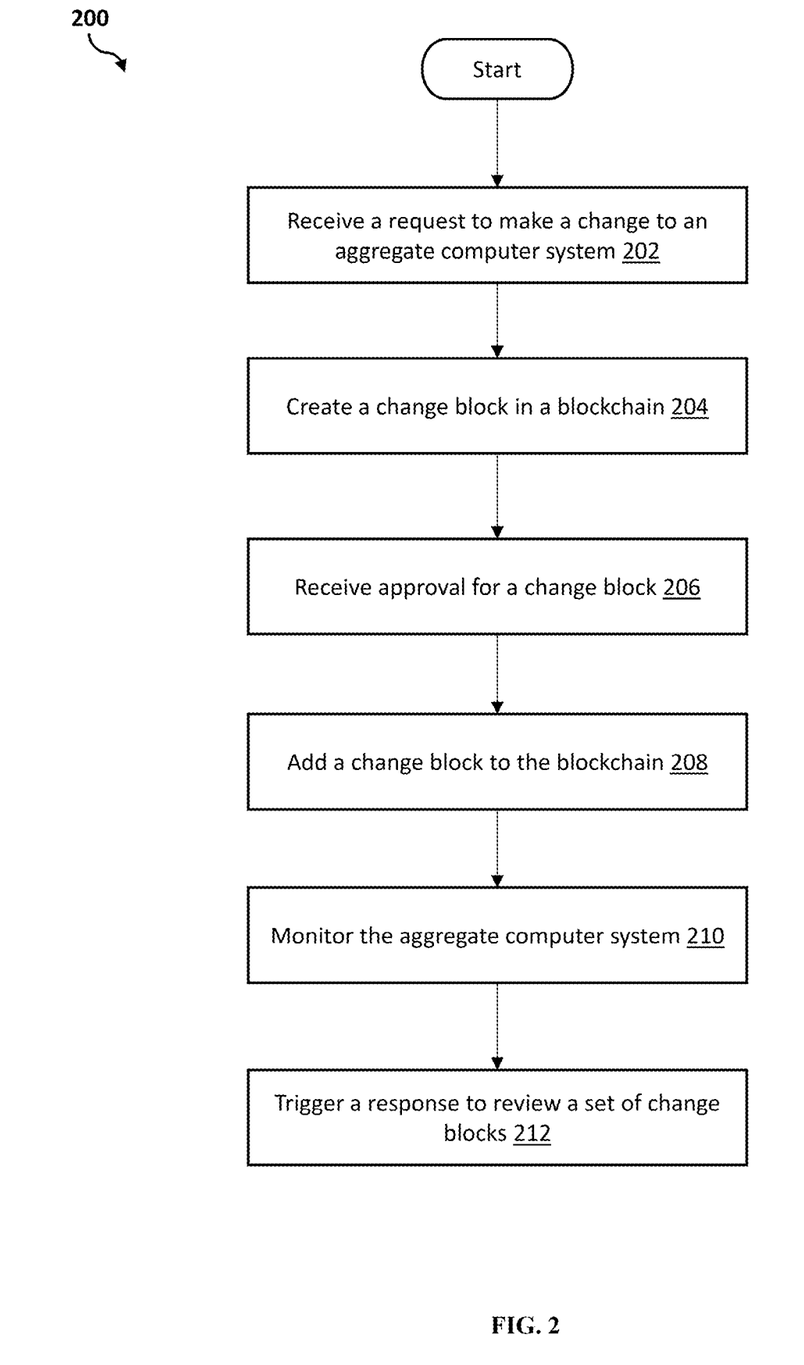
FIG. 2 is an operational flowchart illustrating a process for multi-vendor management according to at least one embodiment.

Referring now to FIG. 2, an operational flowchart illustrating the exemplary multi-vendor management process 200 used by the multi-vendor management program 110a and 110b according to at least one embodiment is depicted.

At 202, the multi-vendor management program 110 receives a request. The multi-vendor management program 110 may receive a request to make a change to an aggregate computer system. The multi-vendor management program 110 may receive the request to make the change to the aggregate computer system from one of the at least two participants (e.g., stakeholders, vendors, users) of the aggregate computer system. The aggregate computer system may be a collaborative network such as, but not limited to, a multi-provider hardware solution, multi-provider software solution, mixed hardware-and-software environment, aggregate cloud environment, hybrid cloud environment, an integrated development environment (IDE), open source project, amongst other collaborative networks. The aggregate computer system may be a combination of all hardware and/or software components, owned and/or vendor supplied, on a client premises and/or hosted, which may be required in enabling a computerized business system. The aggregate computer system may include, but is not limited to including, components such as, computer hardware and/or the computer hardware managing software, storage hardware and/or the storage hardware managing software, operating systems and/or platforms, network hardware, network software, cloud hosting (e.g., on-premises cloud hosting/enablement, public cloud hosting/enablement, hybrid cloud hosting/enablement) and/or enablement, middleware, applications, amongst other components and/or combinations of components.

The multi-vendor management program 110 may utilize blockchain based distributed ledger (e.g., shared ledger, blockchain, Hyperledger) to record changes to the aggregate computer system. Hyperledger may be an open source project to leverage blockchain technology. Blockchain technology may be utilized for a network system to have consensus, authenticity, immutability and finality of the logged changes to the aggregate computer system of the at least two participants (e.g., stakeholders, vendors, users). The blockchain based distributed ledger (e.g., shared ledger, blockchain, Hyperledger) may be an immutable record of all changes to the aggregate computer system stored by the multi-vendor management program 110 in a knowledge corpus (e.g., database 114) shared between the at least two participants (e.g., stakeholders, vendors, users) of the aggregate computer system. The record of all changes to the aggregate computer system may be kept in blocks of data passed to the next transaction in linear order.

The distributed ledger (e.g., shared ledger, blockchain, Hyperledger) may be a proof of stake blockchain in which each of the at least two participants may be a stakeholder utilizing independent computers (e.g., nodes). The independent computers (e.g., nodes) may be grouped in trust domains and may be associated with logical entities that control them in various ways, the logical entities in the present application may be the at least two participants (e.g., stakeholders, vendors, users) of the aggregate computer system. Nodes may include different types, such as a client and/or submitting-client node which submits the request to make a change to the aggregate computer system to an endorser/validator, and broadcasts change blocks to an ordering service (e.g., ordering node). Another type of node may be a peer node which may receive the request to make the change to the aggregate computer system, commit the transactions and maintain a state and a copy of the distributed ledger (e.g., shared ledger, blockchain, Hyperledger) in the knowledge corpus (e.g., database 114).

As will be explained in more detail below with respect to step 206, the multi-vendor management program 110 may utilize one or more consensus mechanisms in approving change requests and/or other requests, such as, but not limited to a Delegated proof of stake (DPoS) mechanisms which may designate the roles of the at least two participants (e.g., stakeholders, vendors, users) as endorsers/validators by enabling the at least two participants to delegate the validation/endorsement roles through an endorsement policy agreed upon between the participants.

At 204, the multi-vendor management program 110 creates a change block in a distributed ledger (e.g., shared ledger, blockchain, Hyperledger). The change block may contain a description of the change to the aggregate computer system for which the request may be received at step 202. The change block may also include, but is not limited to including, a participant (e.g., stakeholder, vendor, user) making the change, time the proposed change was requested, block number, change details, transaction data, previous block hash, amongst other details.

The multi-vendor management program 110 may also generate one or more hash values (e.g., hashes) associated with the change block. A hash value (e.g., hash) may be a numeric value of a fixed length that uniquely identifies data. Hash values (e.g., hashes) may represent large amounts of data utilizing a shorter numeric value. The hash value generated by the multi-vendor program 110 may represent the details associated with the change block, such as, but not limited to, the participant (e.g., stakeholder, vendor, user) making the change, time the proposed change was requested, block number, change details, transaction data, previous block hash, amongst other details.

At 206, the multi-vendor management program 110 receives approval for the change block. The multi-vendor management program 110 may receive approval in accordance with the endorsement policy.

The endorsement policy may include parameters by which the change block may be added to the distributed ledger (e.g., shared ledger, blockchain, Hyperledger). The endorsement policy may be part of a larger service-level agreement (SLA) and/or other agreement between the participants (e.g., stakeholders, vendors, users) which may specify one or more of the at least two participants may act as endorsers/validators, may require all of the participants act as endorsers/validators, and/or may include another mechanisms by which consensus may be reached amongst the participants of the aggregate computer system. For example, approval of the change block may require approval from a percentage stake of the participants. Since the multi-vendor management program 110 may utilize a proof of stake blockchain, the participants may designate each participant stake as part of the endorsement policy within the SLA. If there are 5 participants and each has a 20 percent stake, the endorsement policy may require approval for the change block by 60 percent of participants.

At 208, the multi-vendor management program 110 adds the change block to the distributed ledger. The multi-vendor management program 110 may add the change block to distributed ledger (e.g., shared ledger, blockchain, Hyperledger) upon receiving approval from the participants (e.g., stakeholders, vendors, users) in accordance with the endorsement policy including the one or more hash values (e.g., hashes) associated with the change block.

At 210, the multi-vendor management program 110 monitors the aggregate computer system. The multi-vendor management program 110 may monitor the aggregate computer system by performing one or more tests on key performance metrics in pre-determined time intervals. The multi-vendor management program 110 may determine whether any of the one or more key performance metrics may be greater than a performance threshold.

The one or more key performance metrics, pre-determined time intervals, and/or the performance thresholds associated with each of the one or more key performance metrics may be in accordance with the terms agreed upon in the SLA and/or other agreement between the participants (e.g., stakeholders, vendors, users). The SLA and/or other agreement between the participants may include, but is not limited to including, definitions of key performance metrics such as, data rates, throughput, jitter, Input/Output Response Time, Central Processing Unit (CPU) utilization, transaction processing time, Web Page Load time duration, amongst other key performance metrics. The SLA and/or other agreement may also include technical definitions for mean time between failures (MTBF), mean time to repair/mean time to recovery (MTTR), the performance threshold for each of the one or more key performance metrics, pre-determined time intervals by which each of the one or more key performance metrics may be tested, amongst other performance standards to be maintained by the participants.

As will be explained in more detail with respect to step 212, if any of the key performance metrics may be greater than the performance threshold agreed upon between the parties may automatically execute one or more smart contracts requiring a review of one or more change blocks by one or more participants (e.g., stakeholders, vendors, users) of the aggregate computer system.

At 212, the multi-vendor management program 110 triggers a response to review a set of change blocks. The set of change blocks may be comprised on the one or more change blocks which may have been added to the distributed ledger (e.g., shared ledger, blockchain, Hyperledger) in accordance with steps 202 through 206 since the previous tests of the one or more key performance indicators may have been performed by the multi-vendor management program 110.

The response to review the set of change blocks may be executed automatically according to one or more smart contracts. A smart contract may be a program stored on a blockchain that executes upon fulfillment of predetermined conditions (i.e., key performance metrics greater than a performance threshold). The one or more smart contracts utilized by the multi-vendor management program 110 may be self-enforcing agreements between the at least two participants (e.g., stakeholders, vendors, users) of the aggregate computer system in accordance with the terms of the SLA and/or other agreements. The multi-vendor management program 110 may replicate the code of the one or more smart contacts across multiple nodes of the aggregate computer system such that the code may be embedded in each change block added to the distributed ledger (e.g., shared ledger, blockchain, Hyperledger).

The response to review the set of change blocks may be displayed to each participant (e.g., stakeholder, vendor, user) in a multi-vendor management user interface 118. The multi-vendor management user interface 118 may be displayed by the multi-vendor management program 110 in at least an internet browser, dedicated software application, and/or as an integration with a third party software application. The response to review may display each change block of the set of change blocks to the participant (e.g., stakeholder, vendor, user) who requested the change to the aggregate computer system corresponding to the change block. The multi-vendor management program 110 may also display details in accordance with the SLA and/or other agreements such as, but not limited to, time the participant (e.g., stakeholder, vendor, user) has to review each change block, penalties for not reviewing the change block, amongst other details which may be displayed to each participant. The multi-vendor management program 110 may also utilize one or more smart contracts in automatically enforcing penalties agreed to in the SLA and/or other agreement for failure to review a change block in the time specified for review. For example, Participant A may fail to review Change Block 1 within 48 hours of the triggered response to review. The multi-vendor management program 110 may automatically impose a financial penalty using one or more escrow accounts associated with Participant A.

In an embodiment, the multi-vendor management program 110 may not trigger a response to review for all the participants associated with a change block in the set of change blocks. In this embodiment, the multi-vendor management program 110 may compare details of the key performance indicators greater than the performance threshold and the set of change blocks in determining one or more change blocks within the set of change blocks most likely resulted in the key performance indicators rising above the performance threshold. The multi-vendor management program 110 may store which change block and/or the details associated with the change block as well as the corresponding key performance indicator impacted in the knowledge corpus (e.g., database 114). As the multi-vendor management program 110 associates more change blocks with greater than performance thresholds the multi-vendor management program 110 may improve the identification of which change blocks in the set of change blocks most likely resulted in triggering the performance threshold. In this embodiment, the multi-vendor management program 110 may rank the change blocks from the set of change blocks and display the rankings in the multi-vendor management user interface 118. The multi-vendor management program 110 may also utilize display icons and/or other visual displays in denoting the one or more blocks in the ranking of change blocks from the set of change blocks in which review is most important.

Figure 3:
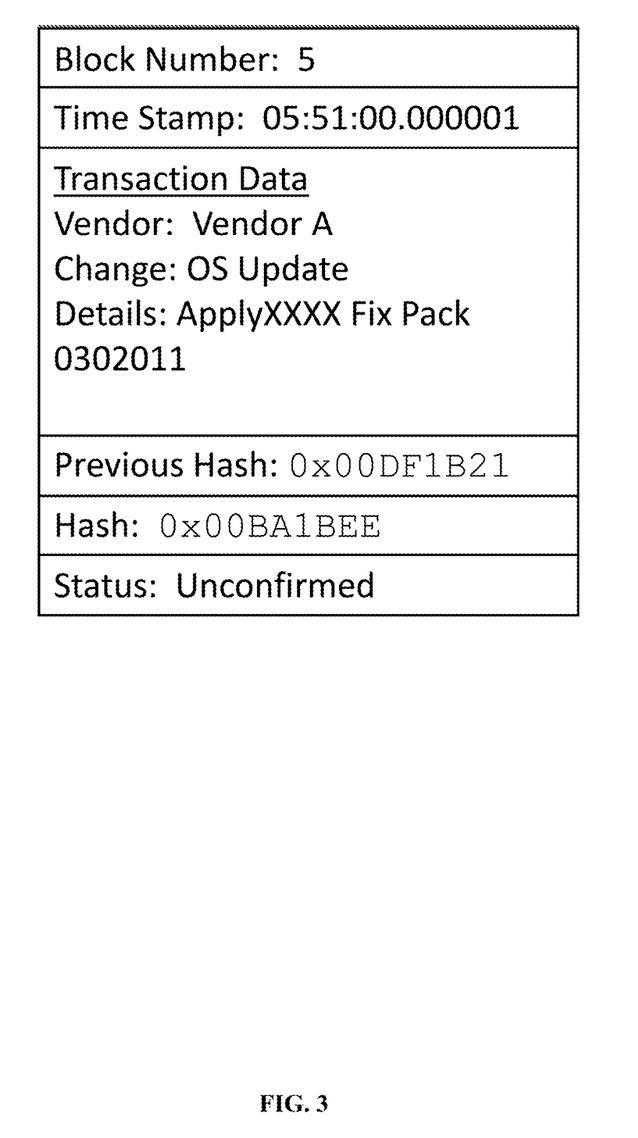
FIG. 3 is an exemplary illustration of a change block.

Referring now to FIG. 3, an exemplary illustration of a change block created by the multi-vendor program 110 is depicted. The change block depicted includes the block number, time associated with the proposed change to the aggregate computer system, transaction data, the hash value of the previous block in the distributed ledger (e.g., shared ledger, blockchain, Hyperledger), the hash value generated by the multi-vendor management program 110, and the status of the change block.

Figure 4:
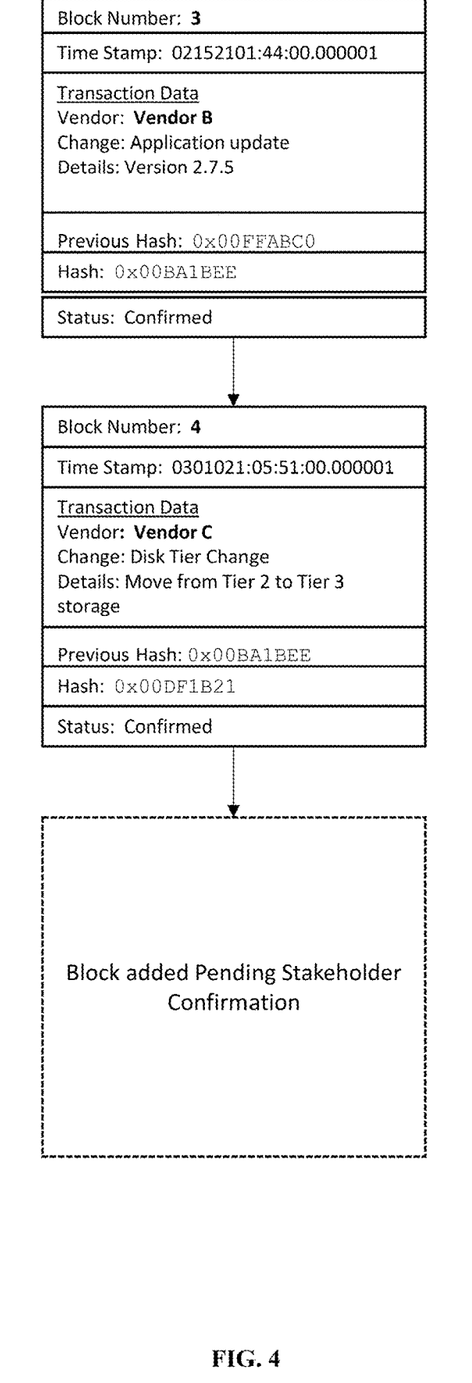
FIG. 4 is an exemplary illustration of a distributed ledger maintained by the multi-vendor program.

Referring now to FIG. 4, an exemplary illustration of the distributed ledger (e.g., shared ledger, blockchain, Hyperledger) maintained by the multi-vendor program 110 is depicted. The change blocks depicted include Block Number 3 and Block Number 4 with the blank box with a dashed outlining depicting the spot where the change block illustrated in FIG. 3 may be added pending participant (e.g., stakeholder, vendor, user) confirmation in accordance with the endorsement policy detailed above at step 206.

Figure 5A:
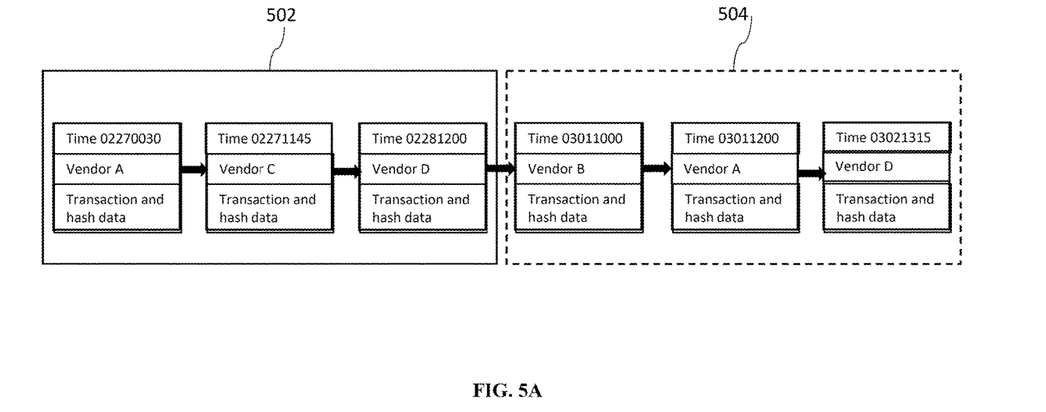
FIG. 5A is an exemplary illustration of a set of change blocks identified within the distributed ledger.

Referring now to FIG. 5A, an exemplary illustration of the set of change blocks identified by the multi-vendor program 110 based on the monitoring of the aggregate computer system is depicted. The set of change blocks are depicted in the dashed box on the right labeled 504. The solid box on the left hand of the screen labeled 502 depicts previous change blocks which may have been approved and/or committed to the distributed ledger previous to the one or more key performance indicators exceeding a performance threshold.

Figure 5B:
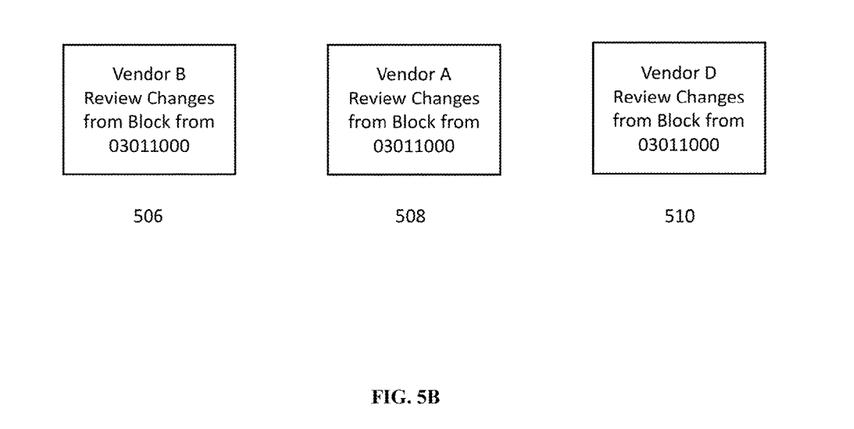
FIG. 5B is an exemplary illustration of a display to each participant to review the set of change blocks.

Referring now to FIG. 5B, an exemplary illustration to review the set of change blocks displayed to each participant in the multi-vendor management user interface 118 is depicted. The review labeled 506 may be displayed in the multi-vendor management user interface 118 to Vendor B, the review labeled 508 may be displayed in the multi-vendor management user interface 118 to Vendor A, and the review labeled 510 may be displayed in the multi-vendor management user interface 118 to Vendor D.

It may be appreciated that FIGS. 2 through 5B provide only an illustration of one embodiment and do not imply any limitations with regard to how different embodiments may be implemented. Many modifications to the depicted embodiment(s) may be made based on design and implementation requirements.

Figure 6:
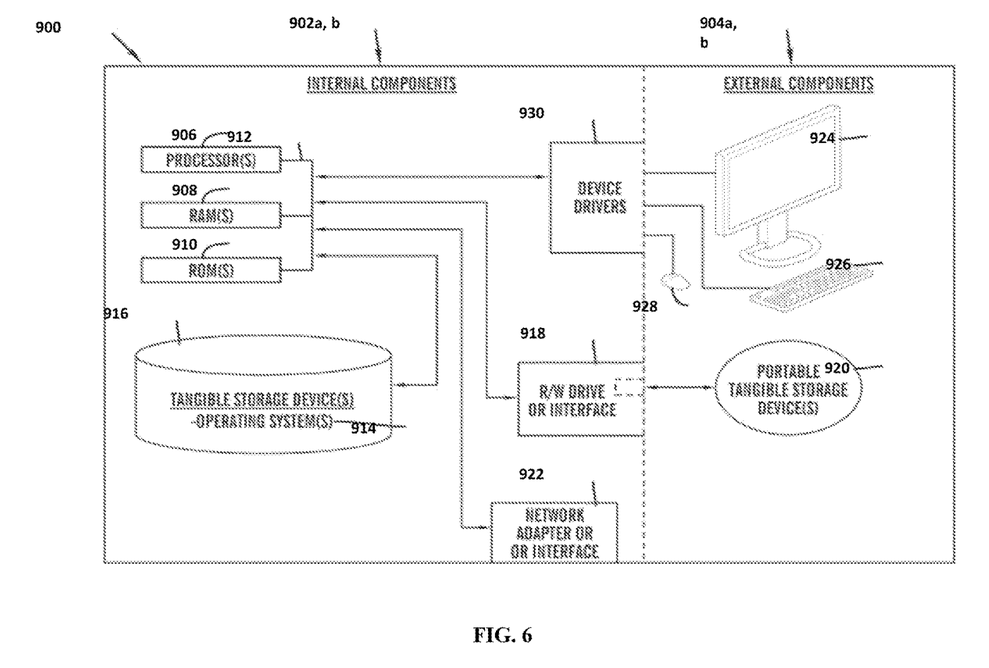
FIG. 6 is a block diagram of internal and external components of computers and servers depicted in FIG. 1 according to at least one embodiment.

FIG. 6 is a block diagram 900 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 6. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the multi-vendor management program 110*a* in client computer 102, and the multi-vendor management program 110*b* in network server 112, may be stored on one or more computer-readable tangible storage devices 916 for execution by one or more processors 906 via one or more RAMs 908 (which typically include cache memory). In the embodiment illustrated in FIG. 6, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the multi-vendor management program 110*a* and 110*b* can be stored on one or more of the respective portable computer-readable tangible storage devices 920, read via the respective RAY drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the multi-vendor management program 110*a* in client computer 102 and the multi-vendor management program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the multi-vendor management program 110*a* in client computer 102 and the multi-vendor management program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
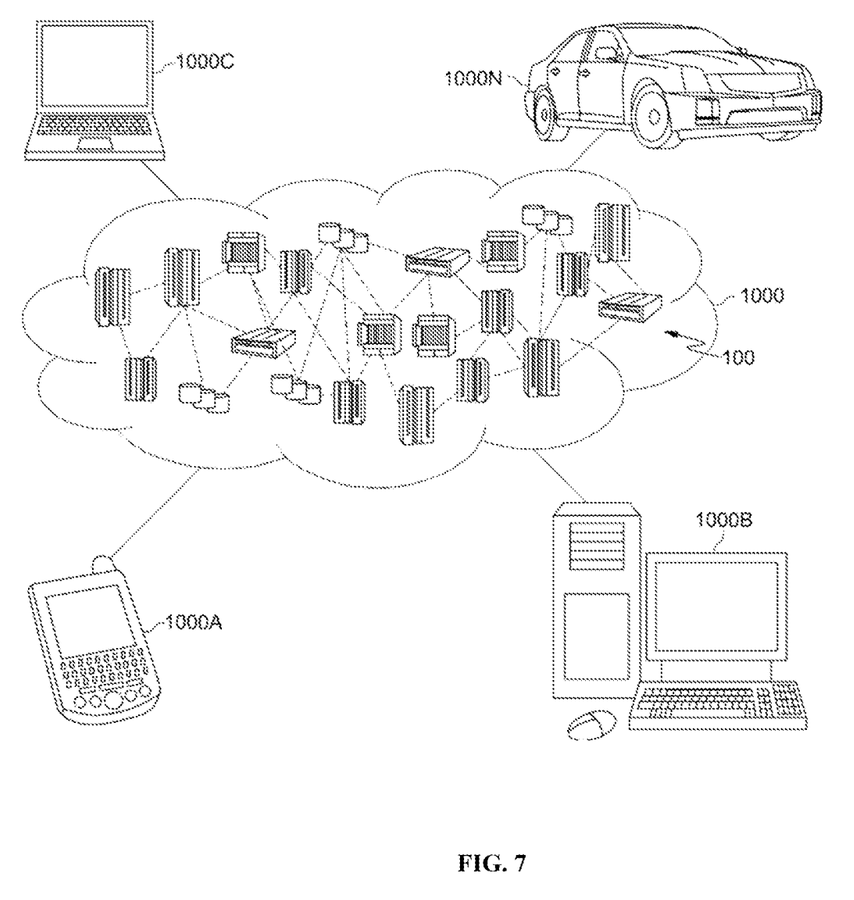
FIG. 7 is a block diagram of an illustrative cloud computing environment including the computer system depicted in FIG. 1, in accordance with an embodiment of the present disclosure.

Referring now to FIG. 7, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 7 are intended to be illustrative only and that computing nodes 100 and cloud computing environment 1000 can communicate with any type of computerized device over any type of network and/or network addressable connection (e.g., using a web browser).

Figure 8:
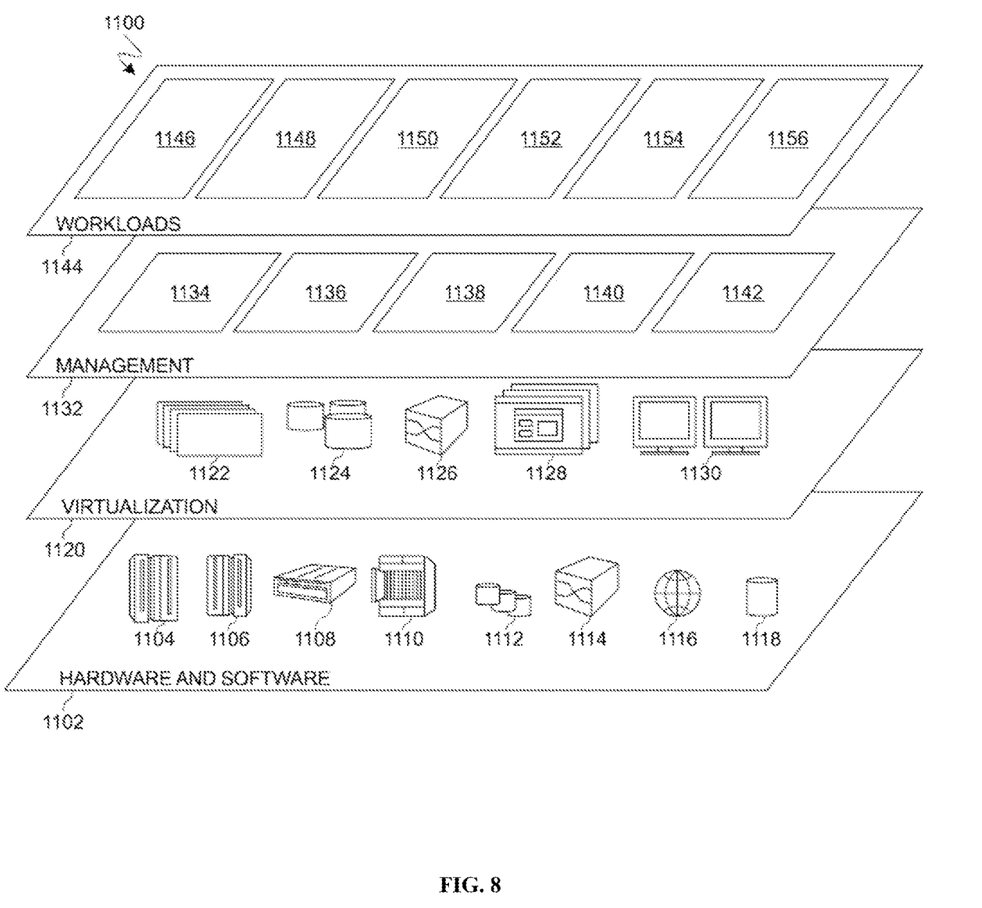
FIG. 8 is a block diagram of functional layers of the illustrative cloud computing environment of FIG. 7, in accordance with an embodiment of the present disclosure.

Referring now to FIG. 8, a set of functional abstraction layers 1100 provided by cloud computing environment 1000 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and multi-vendor management program 1156. A multi-vendor management program 110a, 110b provides a way to track changes made to an aggregate computer system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The present disclosure shall not be construed as to violate or encourage the violation of any local, state, federal, or international law with respect to privacy protection.

What is claimed is:

1. A method for managing a multi-vendor environment, the method comprising:
    receiving a request to make a change to an aggregate computer system from a participant of the aggregate computer system;
    creating, in response to the request, a change block;
    receiving approval for the change block in accordance with an endorsement policy, wherein the endorsement policy is part of a service-level agreement between at least two participants of the aggregate computer system, wherein the endorsement policy includes parameters by which the change block may be added to a distributed ledger;
    adding the change block to the distributed ledger; and
    monitoring a performance of the aggregate computer system.

2. The method of claim 1, wherein the change block includes at least, a description of the change, the participant making the change, and the time proposed for the change.

3. The method of claim 1, wherein monitoring the performance of the aggregate computer system further comprises:
    detecting a change in the performance of the aggregate computer system based on testing one or more key performance indicators, wherein at least one of the one or more key performance indicators is greater than a performance threshold included within the service-level agreement.

4. The method of claim 3, further comprising:
triggering, in response to detecting the change in performance, a review of a set of change blocks, wherein the change block is within the set of change blocks.

5. The method of claim 4, wherein the review of the set of change blocks is triggered automatically according to one or more smart contracts, and wherein the review of the set of change blocks is displayed to each of the at least two participants in a multi-vendor management user interface.

6. The method of claim 5, further comprising:
assigning each change block within the set of change blocks to one of at least two participants, wherein each change block is assigned to one of the at least two participants who requested a corresponding change to the aggregate computer system.

7. The method of claim 5, wherein the review of the set of change blocks displayed to each of the at least two participants in the multi-vendor management user interface includes an amount of time each participant has to review the set of change blocks and one or more penalties for not reviewing the set of change blocks in the amount of time allocated in accordance with the service-level agreement.

8. A computer system for managing a multi-vendor environment, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system performs a method comprising:
receiving a request to make a change to an aggregate computer system from a participant of the aggregate computer system;
creating, in response to the request, a change block;
receiving approval for the change block in accordance with an endorsement policy, wherein the endorsement policy is part of a service-level agreement between at least two participants of the aggregate computer system, wherein the endorsement policy includes parameters by which the change block may be added to a distributed ledger;
adding the change block to the distributed ledger; and
monitoring a performance of the aggregate computer system.

9. The computer system of claim 8, wherein the change block includes at least, a description of the change, the participant making the change, and the time proposed for the change.

10. The computer system of claim 8, wherein monitoring the performance of the aggregate computer system further comprises:
detecting a change in the performance of the aggregate computer system based on testing one or more key performance indicators, wherein at least one of the one or more key performance indicators is greater than a performance threshold included within the service-level agreement.

11. The computer system of claim 10, further comprising:
triggering, in response to detecting the change in performance, a review of a set of change blocks, wherein the change block is within the set of change blocks.

12. The computer system of claim 11, wherein the review of the set of change blocks is triggered automatically according to one or more smart contracts, and wherein the review of the set of change blocks is displayed to each of the at least two participants in a multi-vendor management user interface.

13. The computer system of claim 12, further comprising:
assigning each change block within the set of change blocks to one of at least two participants, wherein each change block is assigned to one of the at least two participants who requested a corresponding change to the aggregate computer system.

14. The method of claim 7, wherein the one or more penalties for not reviewing the set of change blocks are automatically enforced utilizing the one or more smart contracts.

15. A computer program product for managing a multi-vendor environment, comprising:
one or more non-transitory computer readable storage media, and program instructions collectively stored on the one or more non-transitory computer readable storage media, the program instructions comprising:
receiving a request to make a change to an aggregate computer system from a participant of the aggregate computer system;
creating, in response to the request, a change block;
receiving approval for the change block in accordance with an endorsement policy, wherein the endorsement policy is part of a service-level agreement between at least two participants of the aggregate computer system, wherein the endorsement policy includes parameters by which the change block may be added to a distributed ledger;
adding the change block to the distributed ledger; and
monitoring a performance of the aggregate computer system.

16. The computer program product of claim 15, wherein the change block includes at least, a description of the change, the participant making the change, and the time proposed for the change.

17. The computer program product of claim 15, wherein monitoring the performance of the aggregate computer system further comprises:
detecting a change in the performance of the aggregate computer system based on testing one or more key performance indicators, wherein at least one of the one or more key performance indicators is greater than a performance threshold included within the service-level agreement.

18. The computer program product of claim 17, further comprising:
triggering, in response to detecting the change in performance, a review of a set of change blocks, wherein the change block is within the set of change blocks.

19. The computer program product of claim 18, wherein the review of the set of change blocks is triggered automatically according to one or more smart contracts, and wherein the review of the set of change blocks is displayed to each of the at least two participants in a multi-vendor management user interface.

20. The method of claim 14, wherein the one or more penalties includes at least a financial penalty enforced using the one or more smart contracts and an escrow account of a non-compliant participant.

* * * * *